Nov. 27, 1962  R. E. McCOY  3,066,285
SIGNAL CONVERSION SYSTEM
Filed Oct. 7, 1958  3 Sheets-Sheet 2

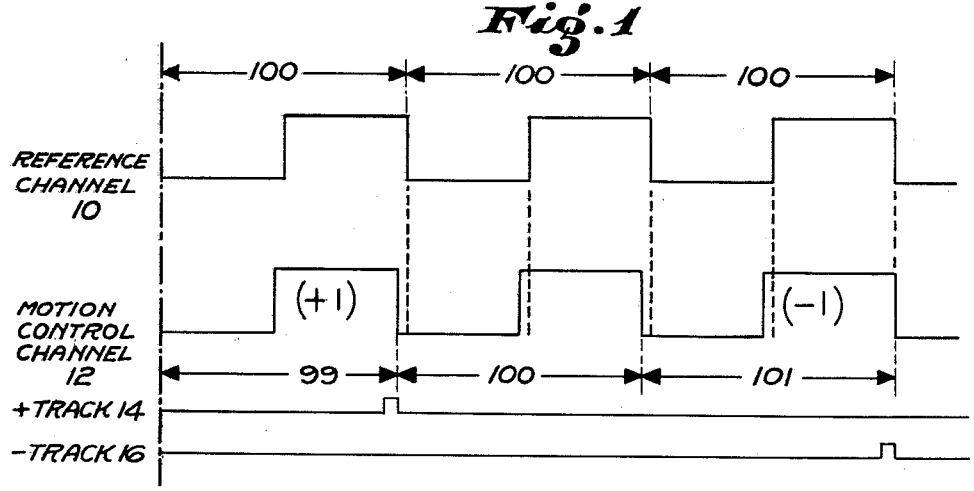
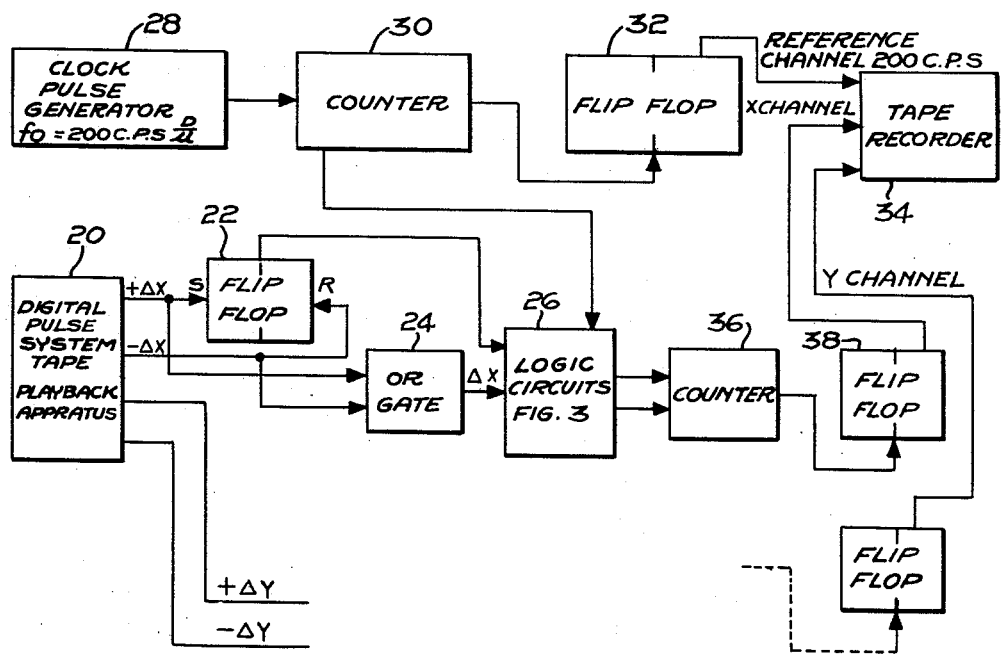

INVENTOR.
ROBERT E. McCOY
BY
Lyon & Lyon
ATTORNEY'S

Nov. 27, 1962  R. E. McCOY  3,066,285
SIGNAL CONVERSION SYSTEM
Filed Oct. 7, 1958  3 Sheets-Sheet 3

INVENTOR.
ROBERT E. McCOY
BY Lyon & Lyon
ATTORNEY'S

United States Patent Office 3,066,285
Patented Nov. 27, 1962

3,066,285
SIGNAL CONVERSION SYSTEM
Robert E. McCoy, Los Angeles, Calif., assignor, by mesne assignments, to General Electric Company, a corporation of New York
Filed Oct. 7, 1958, Ser. No. 765,894
4 Claims. (Cl. 340—347)

This invention relates to systems for converting one system of representative electrical signals to another system of representative electrical signals. More particularly, this invention is directed to an arrangement for converting one system of electrical signals used for motion or path control to another system of electrical signals used for motion or path control.

In a publication entitled, "Proceedings of the Eastern Joint Computer Conference," published by the Institute of Radio Engineers, Inc., which contains the papers and discussions presented at the joint IRE-ACM-AIEE Computer Conference in Washington, D.C., on December 9–13, 1957, two papers of interest herein were published. One of these is called the "Numericord Machine-Tool Director," by Gerald T. Moore, and the other paper is called the "Logical Organization of the Digimatic Computer," by Jack Rosenberg. Both papers describe arrangements for producing electrical signals which can be recorded, for example, on magnetic tape. These electrical signals are employed for directing motion by a machine tool. For each co-ordinate axis along which motion is to occur, a separate train of signals existing on a separate track on the recording medium is provided.

The present visualization for machine-tool control systems of the type described in these two articles is that one portion of the system, which may be called the director, will be employed for the purpose of providing recordings of control signals from input information. The input information will consist of data indicative of the path or shape a machine tool must create on a workpiece in response to the control signals. Another portion of the system will comprise the arrangement which actually controls the machine tool and usually includes a loop wherein the control signals which are on the tape made on the director are read and applied to motors moving a machine-tool table along a specified axis. Transducers may be employed for feeding back a signal to the input of the servoloop, indicative of the fact that a command signal has been obeyed. An arrangement illustrative of the apparatus for generating the control or command signals in a director and also for reproducing these signals in a digital servoloop which controls a machine tool is described and claimed in a patent by Jack Rosenberg et al., No. 2,833,941.

In view of the rapid operation of the director apparatus, it is envisioned that instead of having one of these provided for every machine tool that is controlled by a servoloop, one of the directors can be provided for a plurality of the locations where the output tapes are played, or even one director may be provided centrally for an entire area. However, in view of the fact that the command signals which are recorded in each of the two systems previously specified are different, the machine-tool control systems on which they are played are different, and it is not possible to interchange the tape recordings made by the two types of directors. Since the process of programming or applying input information for complex forms or paths is a time-consuming task, it would be an economic waste to require that once a recording of this type has been made it is necessary to do it over again if it is desired to control a machine tool employing a servoloop system which responds to the control signals of the other type of system.

Accordingly, it is an object of this invention to provide a simple arrangement for converting motion-control signals of one system to motion-control signals of another system.

A further object of the present invention is an arrangement for enabling the use of a recording of motion-control signals in one system in another different system.

Yet another object of the present invention is the provision of a novel, useful, and simple arrangement for enabling the information derived from a director in accordance with one system to be converted into information which can be derived from a director of another system.

These and other objects of the invention are achieved by apparatus in which signals, of a type wherein the phase shift of the signals with respect to a reference is proportional to the distance to be commanded, are converted to signals wherein each pulse represents an increment of commanded motion. Means are also provided for reversing such conversion.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

FIGURE 1 is a wave shape diagram shown to assist in an understanding of the invention;

FIGURE 2 is a block diagram of an embodiment of the invention for converting a digital-control-pulse train to an analog-control-pulse train;

FIGURE 3 is a block diagram illustrating further details of the apparatus shown in FIGURE 2;

FIGURE 4 is a block diagram of an embodiment of the invention for converting an analog-control-pulse train to a digital-control-pulse train.

Figure 5:
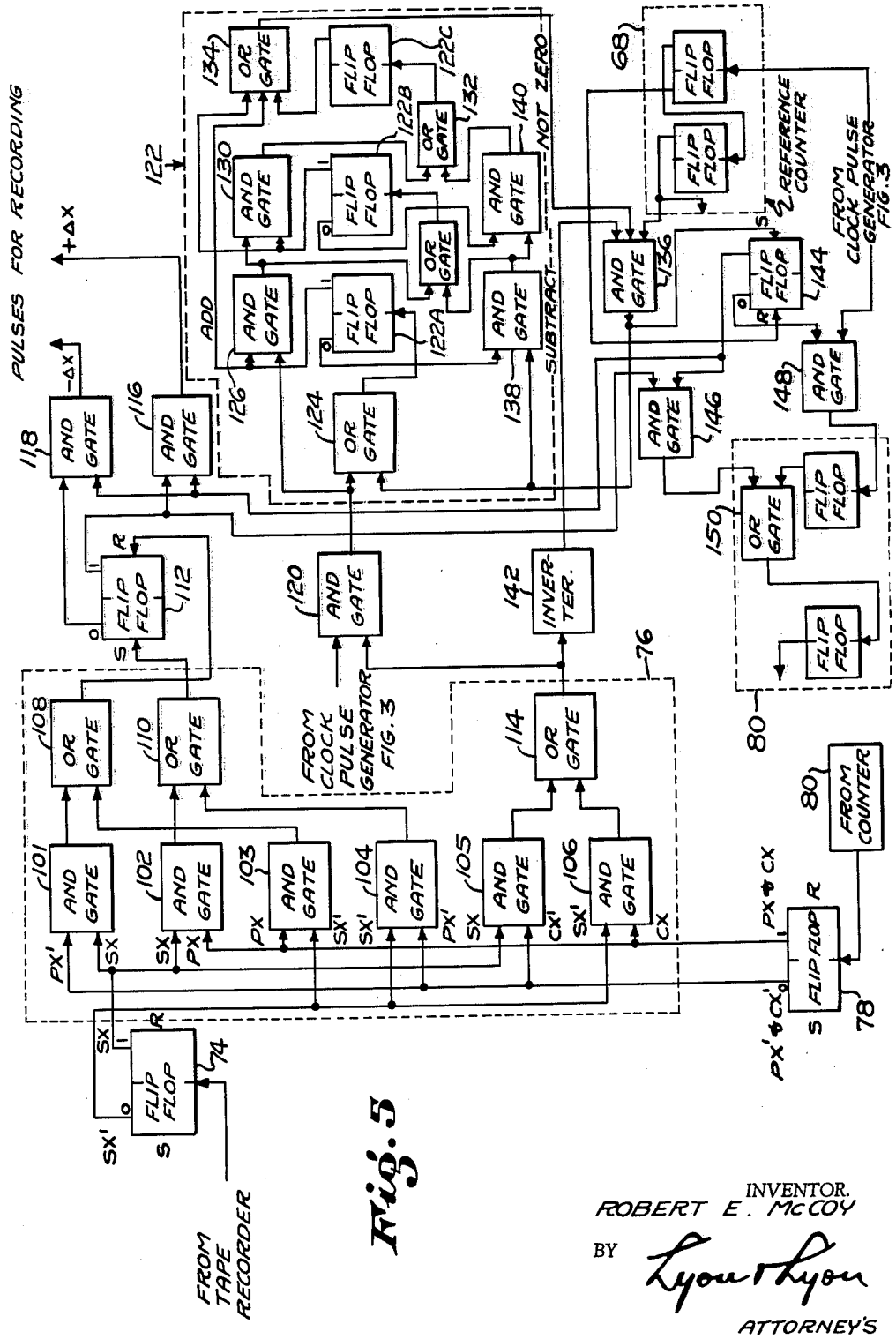
FIGURE 5 is a block diagram illustrating further details of the apparatus shown in FIGURE 4.

Referring now to FIGURE 1, there may be seen the two different arrangements for representing motion-command signals. The motion-command signals from one director are henceforth designated as analog-command signals and from the other director are designated as digital-command signals. The wave shapes 10 and 12 represent the analog-command signals, and the wave shapes 14, 16 represent the digital-command signals. Since it is desired to command motion at the machine tool along a plurality of different co-ordinate axes, the magnetic-tape record produced by a director will contain one or more tracks which are associated with each axis. In the case of the analog-command signal arrangement, there is provided on the magnetic tape a reference channel which contains a recording of square waves occurring at a reference frequency. In addition, for each different axis, there is a motion-control channel represented by the square wave 12 which comprises signals which are phase shifted with respect to the reference by an amount proportional to the command distance. As illustrated in FIGURE 1, the wave shape 12 has essentially the same frequency as the reference channel; however, the length of the first square wave is 99 units, as compared to the 100-unit length of the reference channel. This indicates to the axis of the machine tool that one increment of motion should occur.

In the motion-control channel, the following cycle of the wave shape 12 has a length equivalent to 100 units and, therefore, no motion will occur. The succeeding square wave cycle in the motion-control channel has a length of 101 units. This is indicative of a command that one unit of motion occur in a reverse direction.

In the digital-motion-command system, as previously indicated, one pulse represents a motion command of one increment. Two tracks are provided on tape for each co-ordinate axis being controlled. These two tracks correspond to a channel. One of these tracks records the command for motion in a positive direction; the other of these tracks records the command for motion in a negative direction. For the purpose of further illustrating the flexibility of this invention, let it be assumed that each cycle of phase shift in the analog-command signals represents 0.100 inch while each pulse of the digital-command signal system represents 0.001 inch of motion. Other scale relations could be used; for example, at times after a pre-arranged signal (for rapid traverse) each pulse of the digital-command system may be used to represent 0.010 inch of motion.

Assume for the purposes of explaining this invention that the square waves of the reference channel in the analog-control signal system occur at a frequency of 200 cycles per second. Thus, the motion-control channel will have square waves which also occur at 200 cycles per second, but which will have variations in phase to an extent required to represent the extent of motion.

Using as an illustration the apparatus actually manufactured by the aforesaid manufacturer of the Numericord, as well as some others, a frequency of 200 cycles per second is employed in the phase-shift systems, and the distance corresponding to the phase shift of one full cycle of the carrier frequency is $D=0.100$ inch. The distance represented by one pulse in the digital systems as established in the aforesaid system described in the patent by Rosenberg et al., the distance represented by one pulse is $U=0.001$ inch. A master-clock frequency, which, for example, may be an oscillator controlled by a crystal, so that a highly stable frequency is obtained, is employed to drive a pulse generator to produce pulses at a repetition frequency $f_0$ equal to 20 kilocycles per second, which is related to the final carrier frequency $f_c$ equal to 200 cycles per second, as follows: $f_0=f_c(D/U)$, where D is equal to 0.100 inch and U is equal to 0.001 inch. A wide range of other values may be used; for example, if more rapid computation is desired, all frequencies may be increased by the same factor (such as ten times), the resulting output then being recorded at a speed proportionately higher than the intended playback speed.

For the purpose of deriving the phase-shift control pulses from the digital-control pulses in the reference channel and in each motion channel, the pulse-repetition frequency $f_0$ is divided by the ratio D/U in a series of predetermining counters and a flip-flop, which ultimately produces a square wave of the desired carrier frequency $f_c$. The square wave output of each channel is recorded on a separate track of a multitrack tape recorder.

Reference is now made to FIGURE 2, which is a block diagram of an embodiment of the invention for converting motion-command pulses in the digital-pulse system to motion-command pulses in the analog system. The motion-command pulses in the digital system are recorded on magnetic tape which is read in well-known manner by tape playback apparatus 20, which in FIGURE 2 is designated as digital-pulse-system tape-playback apparatus. As previously described, the manner of recording these pulses is to provide two tracks for each channel, one of which contains pulses representative of the desired motion increments in a positive direction, and the other of which contains pulses representative of motion increments in a negative direction. The positive and negative tracks will never have pulses recorded simultaneously. The output of the positive track for the X channel, designated on the drawing by $+\Delta X$, is applied to one input of a flip-flop circuit 22, and whenever the $+\Delta X$ pulse appears the flip-flop circuit 22 is driven to its set condition if not already there. The output from the negative direction track, which is designated as $-\Delta X$, is applied to the other side of the flip-flop circuit 22. It serves to reset the flip-flop circuit whenever the pulse appears on this track. Accordingly, the set output of the flip-flop 22 is indicative of the fact that positive motion-command pulses are being obtained. The output from the two tracks in the X channel are also applied to an OR gate 24. Thus, the output of the OR gate 24 comprises pulses which may be derived from either the positive or the negative track on the X channel.

The "one" output of the flip-flop 22, consisting of a signal indicative of a positive-command pulse having been read, and the output of the OR gate 24, consisting of motion-command pulses, are both applied to the rectangle designated as logic circuits 26. These logic circuits are shown in greater detail in FIGURE 3 of the drawings.

A clock-pulse generator 28 provides an output consisting of 20 kilocycles per second. This is applied to the counter 30, which divides this input signal by 50. The output from the first stage of the counter 30 is applied to the logic circuit 26. The output from the last stage of the counter 30 is applied to a flip-flop 32. The flip-flop 32 will be set and reset successively in response to the successive outputs of the counter 30. Since the counter divides the 20-kilocycle frequency by 50, the input to the flip-flop will be 400 cycles. Flip-flop 32 divides this 400 cycles by two, and therefore the output from the flip-flop 32 will be a rectangular wave having a frequency of 200 cycles per second. This is the reference frequency. It is applied to a tape recorder 34 for recording as the reference frequency in the reference channel.

The logic circuits 26 operate to advance or retard the output of a counter 36 relative to the output of the counter 30. Counters 30 and 36 both have the same count capacity, and, in the absence of any command pulses being read from the playback apparatus 20, the outputs of both counters will occur at the same frequency and with no relative phase shift. However, when a command pulse is read by the playback apparatus, indicative of a command for motion in a positive direction, the counter 36 will have an extra count inserted therein to advance the phase of its output relative to the output of the counter 30. The phase of counter 36 will be retarded in the event the command pulse read from the playback apparatus indicates a negative increment of motion. The output of the counter 36 is applied to the flip-flop 38, in order that it may have its frequency divided by two and be recorded in the tape recorder 34 at the same frequency as the frequency of the reference channel. Flip-flop 38 is set and reset successively in response to successive output pulses from counter 36. The output of the digital-pulse-system playback apparatus obtained by reading the Y motion-command channel is applied to similar apparatus as the output of the X motion-command channel. Any other motion-command channels for commanding a motion along other co-ordinates would likewise be applied to apparatus similar to that shown for the X channel for conversion into a phase-shift pulse-type of system. Only one reference channel is necessary for all the motion-command channels.

Reference is now made to FIGURE 3 of the drawings which shows a block diagram of the details of the logic circuits 26. A command pulse from OR gate 24 sets flip-flop 40. The output of flip-flop 40, when in its set condition, is applied to an AND gate 42. AND gate 42 can provide an output to set a flip-flop 44 upon the occurrence of the next odd numbered clock pulse from the clock-pulse generator 28 after the command pulse initially applied to flip-flop 40. It will be seen that the odd-numbered clock pulse activates the set output of a flip-flop 46. This is the first flip-flop stage in the counter 30 (reference counter). This flip-flop is driven from its reset to its set condition, and from set to reset, in response to successive clock pulses. If the flip-flop 46 initially is in its reset state, then the odd clock pulses drive it to its set state from its reset state. Thus, the output of the flip-flop 46 to enable AND gate 42 to set flip-flop 44 occurs in response to an odd-numbered clock pulse.

The output of flip-flop 44, when in its set condition, is applied to AND gate 48. AND gate 48 will provide an output, providing that flip-flop 22 is providing the second required input in response to the fact that the motion-command pulse being read or the motion commanded is positive. The output of flip-flop 44 is also employed to reset flip-flop 40. The output of AND gate 48 is applied to an OR gate 50. This OR gate is employed to advance the count in counter 36 by two. This is performed by applying the output of OR gate 50 to drive the second flip-flop 52 in counter 36. Another input to counter 36 is by way of an AND gate 54. This AND gate can apply its output to drive flip-flop 51, which is the first stage in the counter 36. Thus, the output of AND gate 54 advances the count of counter 36 by one count and the output of OR gate 50 advances the count of counter 36 by two counts. A buffer amplifier 49 applies the reset output of flip-flop 46 to reset flip-flop 44. The buffer amplifier 47 applies the set output of flip-flop 46 to AND gate 42.

To further clarify the explanation of the operation of the logic circuits 26 in conjunction with the counters 30 and 36, at the outset it should be understood that at least the first stage of each counter consists of a flip-flop circuit, respectively 51 for the counter 36 and 46 for the counter 30. The remaining stages of these two counters can be well-known structure. They can comprise a sufficient number of additional flip-flop circuits to obtain the required division, or, if desired, the output of the initial flip-flop circuit in each counter can be applied to other types of counters, such as those operating in a decimal system, for obtaining the required division. In any event, the output of the clock-pulse generator is applied to the flip-flop 46 for the purpose of driving it from its reset to its set, to its reset condition successively, in response to the successive clock pulses. Each time flip-flop 46 leaves its set condition, it applies an output pulse to drive flip-flop 56 from its reset to its set, to its reset condition successively. Pulses corresponding to the odd and even clock pulses are derived in the manner previously described from the output of flip-flop 46.

In the absence of any command pulses being read by the tape reader, the clock pulses are simultaneously applied to counter 30 and through AND gate 54 to counter 36, so that these counters may advance simultaneously. After the arrival of a command pulse representative of a command for positive motion, AND gate 54 is blocked for one clock-pulse interval by flip-flop 44, thus blocking the application of a clock pulse to the counter 36; and instead counter 36 has its count advanced two counts, or plus two. As a result, the counter 36 will complete its count ahead of counter 30, and the output of flip-flop 38 will be shorter for one cycle than the output of flip-flop 32. These outputs will resemble that shown for the first cycle of wave shapes 10 and 12 of FIGURE 1.

Continued presence of positive-command pulses will continue to add two counts into counter 32, while the reference counter 30 only advances by one count. It should be appreciated that the operation described only blocks even clock pulses from the counter 36. Odd clock pulses are applied to both counters and, in addition, counter 36 is advanced two counts (instead of the usual one count) at the even clock pulse following the first odd pulse after each command pulse received indicative of a motion required in a positive direction.

When a command pulse, indicative of motion required in a negative direction, is read by the tape playback apparatus, then flip-flop 22 is reset and flip-flop 40 is set in response thereto. At the next odd clock pulse, output of flip-flop 46 is applied through buffer amplifier 47 to enable AND gate 42 to set flip-flop 44. Thus, AND gate 54 is unable to pass the next even clock pulse that occurs. Counter 30, however, does receive this even clock pulse and advances one count. As a result, counter 36 falls behind one count. Flip-flop 38 in FIGURE 2 will provide as its output the third cycle of wave shape 12, shown in FIGURE 1, which is 101 units and thus there is a phase lag which, in the analog-motion-command pulse system is indicative of motion in a negative direction.

Referring back to FIGURE 3, the response of flip-flop 46 to the even-numbered clock pulse which is not passed through AND gate 54 is applied by buffer amplifier 49 to reset flip-flop 44. Since when set flip-flop 44 had reset flip-flop 40, the logic circuit 26 is now in condition to respond to the next command pulse. In summary of the above, a command pulse for motion in a positive direction will advance the counter 36 one count more than the counter 30 is advanced, whereas in response to a command pulse indicative of motion in the negative direction the count of counter 36 is made one less than the count of counter 30. Since effectively there is a division by one hundred obtained, considering the combination of counter 30 and flip-flop 32 as one dividing counter, and the combination of counter 36 and flip-flop 38 as a second dividing counter, an increase of one count causes a relative phase shift of the outputs of $\frac{1}{100}$ of a cycle and a decrease of one count causes an opposite relative phase shift of $\frac{1}{100}$ of a cycle. Except for such changes, successive cycles are alike, and the phase difference between square waves of the reference and motion channels remains fixed until the next digital command pulse.

FIGURE 4 is a block diagram of an embodiment of the invention for converting an analog-control-pulse train to a digital-control-pulse train. The problem here is to detect the presence of a phase shift and whether this phase shift is indicative of a positive or negative motion command, and then to produce a digital pulse and record it in the proper track of the channel on the tape in the digital-pulse system. In analog-pulse system tape playback, apparatus 60 reads the tape containing the analog-control pulses. As previously described, these will comprise one channel wherein the reference frequency is recorded and a separate channel for each co-ordinate of motion to be controlled wherein the pulses are recorded whose phase shift relative to the reference frequency recording indicates the motion commands. Although square waves were recorded on the tape, playback normally produces pulses of one polarity corresponding to the rise, and of the opposite polarity corresponding to the fall, of each square wave. The output of the reading head (not shown) over the reference frequency channel is converted, through suitable and well-known reading amplifiers, to a signal which can drive the flip-flop circuit 62, thus reproducing a square wave like that originally recorded. The output of this flip-flop circuit is applied to a phase discriminator 64. The details of the phase discriminator employed herein will be shown subsequently in FIGURE 5. The phase discriminator compares the signals received from flip-flop 62 with those received from a flip-flop 66. Flip-flop 66 is driven successively to its set and reset conditions by the output of a counter 68. This counter 68 divides by 50 the output frequency of a clock-pulse generator 70, which provides output pulses at a 20 kc./s. frequency. Thus, effectively, counter 68 and flip-flop 66 comprise a divide-by-one-hundred counter. The input to the phase discriminator from the flip-flop 66 is a signal having a frequency of 200 cycles per second. It will be recalled that the signal recorded in the reference channel should also be reproduced at 200 cycles per second.

The output of the phase discriminator 64 consists of an error signal indicative of any difference between the 200 cycles per second being read from the tape and that being received from the flip-flop 66. A drive-motor speed control 72, in response to the error signal, will speed up or reduce the speed at which the tape is being pulled past the reading heads in order to minimize any difference between the frequency being read from the tape and that being derived from the clock-pulse generator. This type of servocontrol system is well known in this art and is normally a part of the apparatus which uses the analog-signal system for controlling machine-tool motions.

The reading head over the X channel on the tape produces an output which, after suitable amplification, is applied to drive a flip-flop 74. This flip-flop applies its output to a phase discriminator 76. The phase discriminator compares this input with that from a flip-flop 78. The flip-flop 78 is driven by a divide-by-fifty counter 80. This counter will also receive pulses from the clock-pulse generator by way of apparatus designated by the legend "logic circuits" 82 (shown in FIGURE 5). These logic circuits, in response to the phase-discriminator output, indicative of a lag or a lead phase between the inputs received from flip-flops 74 and 78, will either insert an extra count into the counter 80, or will block the insertion of a count into the counter 80, so that the signals received from the flip-flop 78 are brought into phase with those signals received from the flip-flop 74. The logic circuits 82 also detect whether the phase-difference signals received from the phase discriminator 76 are positive or negative and apply signals to drive suitable recording apparatus in the digital-pulse system tape recorder 88.

The apparatus described for the X channel is duplicated for the Y channel, the Z channel, and channels for any other control axis desired.

FIGURE 5 is a block diagram of details of the phase discriminator employed herein, as well as the logic circuits 82. For convenience, there is also shown other apparatus which is described in FIGURE 4 and which bears the corresponding reference numerals. The output of flip-flop 74 is applied to six AND gates, respectively 101 through 106. The manner of the application of the output of flip-flop 74 is as follows: the zero, or reset, output is applied to AND gates 103, 104, and 106. This output will be designated as $S_x'$. The set output of flip-flop 74, which is designated as $S_x$, is applied to AND gates 101, 102, 105. The output of flip-flop 78 is also applied to the six AND gates 101 through 106 as follows: the zero, or reset, output which bears the letter designations $P_x'$ (for pulse, or A.C. coupled, output) and $C_x'$ (for static, or D.C. coupled, output) is applied to AND gates 101, 104, 105. The set output of flip-flop 78, respectively designated as $P_x$ for the pulse output and $C_x$ for the static output, is applied to AND gates 102, 103, and 106. The output from AND gates 101 and 103 are applied to an OR gate 108. The output of AND gates 102 and 104 are applied to an OR gate 110.

OR gate 108 applies an output to reset a flip-flop 112. OR gate 110 applies an output to set flip-flop 112.

If flip-flops 74 and 78 are in phase, gates 101 through 106 are inactive. If there is a phase lag in the output of the tape playback apparatus 60, then flip-flop 78, which is driven from counter 80, will attain its reset condition before flip-flop 74. As a result, during one half cycle, indicative of a phase lag, $P_x'$ and $S_x$ output overlap, AND gate 101 is enabled to apply an output to OR gate 108, which in turn resets flip-flop 112. During alternate half cycles, a similar result occurs as a $P_x$ pulse overlaps $S_x'$ output, enabling AND gate 103 to deliver an output to OR gate 108; thus, flip-flop 112 is reset as soon as a phase lag appears in the recorded signal, in either half of a cycle.

Should a phase lead signal be read from the tape, then flip-flop 74 is reset ahead of flip-flop 78. As a result, pulse $P_x$ occurs during the half-cycle of matching polarity in $S_x$, thus enabling AND gate 102, or pulse $P_x'$ occurs during the half-cycle of like polarity in $S_x'$, thus enabling AND gate 104; in either case, OR gate 110 is enabled to set flip-flop 112.

For any phase difference between the two square waves $S_x$ and $C_x$, regardless of which one leads or lags, there is a portion of each half-cycle in which $S_x$ has the same polarity as $C_x'$, or $S_x'$ has the same polarity as $C_x$, thereby enabling AND gate 105 or AND gate 106, respectively, to deliver an output to OR gate 114, for a time interval proportional to the phase difference. The output from OR gate 114, in turn, then enables AND gate 120 to deliver clock pulses to OR gate 124. During the remainder of each half cycle, in which $S_x$ and $C_x$ are of opposite instantaneous polarity, while $S_x'$ and $C_x'$ also are of opposite polarity, neither of AND gates 105, 106 provides an output; OR gate 114 has no output either, and consequently inverter 142 produces an output, which is one of the enabling inputs to AND gate 136.

From the above, it will be seen that a phase lead signal from the tape causes flip-flop 112 to be set, and a lagging signal from the tape results in flip-flop 112 being reset. The set output of flip-flop 112 is applied to an AND gate 116, the output of which is employed to record pulses in the positive-motion direction track. The reset output of flip-flop 112 is applied to an AND gate 118, the output of which is employed for recording motion in the negative-motion track of the channel.

OR gate 114 provides an output whenever there is either a lead or a lag in the phase difference between the outputs of flip-flops 74 and 78. This signal is applied to an AND gate 120. The clock-pulse generator 70 applies pulses to the AND gate 120. These clock pulses will pass through AND gate 120 as long as OR gate 114 is activated. This is a measure of the magnitude of the phase difference between the output signals from flip-flops 74 and 78. These clock pulses are counted by a reversible counter 122. The output of AND gate 120 is applied to the reversible counter through an OR gate 124, and an AND gate 126.

The counter 122 comprises three flip-flop stages 122A, 122B, and 122C. More stages could be used, if necessary, but three binary stages are sufficient for the reversible counter at the speeds now contemplated. This number permits accumulation of counts representing phase differences up to 0.07 cycle per (0.0025 second) half-cycle of square waves, or output pulse repetition rates up to 2800 per second while "correcting pulse" rates of 2000 per second are readily available from the reference counter. The meaning of a correcting pulse will become more clear as this explanation progresses. The OR gate 124 applies its output to the flip-flop 122A. Flip-flop 122A is driven successively through its set and reset conditions in response to successive outputs from OR gate 124. AND gate 126 receives, in addition to the same input (from AND gate 120) as OR gate 124, the output of the flip-flop 122A when in its set, or one, condition. At this time, AND gate 126 can apply its output both to an OR gate 128 and to an AND gate 130. OR gate 128 drives a second counter stage 122B successively to its set and reset conditions. AND gate 130 is enabled to deliver an output to OR gate 132 each time it receives both the output of AND gate 126 and the output of flip-flop 122B when in its set condition. OR gate 132 drives flip-flop 122C successively to set and reset conditions. The outputs of the three flip-flops 122A, 122B, and 122C, whenever they are in a set condition, are applied to an OR gate 134. The output of the OR gate 134, which may be considered as an indication of the fact that the reversible counter is not in its zero condition, is applied to an AND gate 136. The reason OR gate 134 output is a "not zero" indication for the counter 122 is because it will have an output whenever any one of the flip-flops 122A, 122B, 122C are in their set condition, which occurs only when there is a count in the counter.

AND gates 126 and 130 comprise the "add" AND gates for the counter. "Subtract" AND gates 138 and 140 serve the function, when enabled, of decreasing the count of the counter just as the "add" AND gates 126 and 130 serve the function of increasing the count of the counter when they are enabled. An output from AND gate 136 is applied to both OR gate 124 and to AND gate 138. AND gate 138 is enabled, whenever flip-flop 122A is in its reset condition, whereby its zero output is applied to AND gate 138. The output of AND gate 138 is applied to the OR gate 128. The output of OR gate 128, as previously described, drives flip-flop 122B. AND gate 140 also receives the output of AND gate 138, and when flip-flop 122B is in its reset condition, its zero output enables AND gate 140 to apply an output to OR gate 132, the output of which, as previously described, will drive flip-flop 122C.

The output of the OR gate 114 is previously described as being applied to an AND gate 120. Its output is also applied to an inverter 142. The inverter output, in the presence of an output from OR gate 114, will inhibit AND gate 136 and block any output being derived therefrom. When there is no output from OR gate 114, the inverter output will permit an output to be derived from AND gate 136 when its other two required inputs are present. An enabling output is derivable from inverter 142 only when flip-flops 74 and 78 have the same instantaneous polarity, but this condition normally occurs during a major part of each half-cycle of the square waves being read from the tape reader. It is only at this time that correcting pulses can be applied to the counter 80 to effectively cause it to be synchronized with the counter 68.

The third required input to AND gate 136 is derived from carry pulses of some convenient stage of the reference counter 68; in the FIGURE 5, this is shown as the second stage of the counter 68. The carry pulses are the pulses that drive the succeeding stage of the counter. AND gate 136, in the presence of this carry pulse, a "not zero" indication from the reversible counter 122, and an output from inverter 142 during the time when there is no output from AND gate 120 provides output which is applied both to the subtract input to the reversible counter 122 and to set the flip-flop 144. The effect of the application of the output of AND gate 136 to both OR gate 124 and AND gate 138 is to subtract a count from the counter 122 or drive it in the direction opposite to the direction in which the counter progresses in response to an add-count pulse. Flip-flop 144 serves the same function as flip-flop 44 in FIGURE 3. Whenever the first stage of the reference counter provides a "noncarry" pulse as that flip-flop stage is driven from a "one" to a "zero" condition, it resets flip-flop 144. Thus, flip-flop 144 will be set by the output of AND gate 136 and will be reset one clock pulse later. In its reset condition, flip-flop 144 enables an AND gate 148 to apply clock pulses to the counter 80, so that the counter may advance one count for each clock pulse received. While in its set condition, flip-flop 144 applies its "one" output to an AND gate 146. This AND gate is enabled to advance the count of counter 80 two counts if flip-flop 112 is in its set condition. This occurs in the presence of an indication that the sign of the motion-command pulses should be positive. The output of AND gate 146 is applied through an OR gate 150 to drive the second flip-flop stage of the counter 80. The structure of AND gate 146 and OR gate 150, in combination with the counter 80, is identical with the operation and structure of OR gate 50 and AND gate 48, shown in FIGURE 3.

As long as the reversible counter 122 has a count therein during each half cycle when an inverter 142 output is obtained, flip-flop 144 will enable AND gate 146 to advance the counter 80 a two count if the direction of the motion which has been sensed is in a positive sense. If it is in a negative sense, then AND gate 146 is not opened, but neither is AND gate 148. Therefore, the counter 80 will lose a single count. Reversible counter 122 controls the initiation of the operation as to the subtraction of a count or the addition of two counts as long as it contains a count. When it is returned to its zero count condition, counter 80 will be in count synchronism with the reference counter 68. It should be pointed out that the output of AND gate 136 is applied to AND gates 116 and 118, the outputs of which are recorded. Either AND gate 116 or AND gate 118 will be enabled in accordance with whether the command pulse that is to be recorded should represent motion in a positive or a negative direction. Thus, the number of motion-command pulses which are recorded is determined by the count stored in the reversible counter 122, which in turn is determined by the extent of the phase displacement between the reference and the command pulse which is sensed. Its sign is determined by the direction of phase displacement relative to the reference pulse train.

The phase discriminator 64, shown in FIGURE 4, is substantially identical with the phase discriminator 76, which has been described in detail in FIGURE 5. An indication as to whether or not there is a positive or a negative difference between the output of flip-flop 62 and the output of flip-flop 66 (FIGURE 4) is sensed in the same manner as is shown for sensing the sign of the difference between the outputs of flip-flops 74 and 78 in FIGURE 5. Also, the fact that there is a difference is sensed, and this, together with the direction of such difference, is applied to the drive motor speed control 72 for correcting the tape speed so that the reference pulses being read therefrom occur at the right frequency.

Accordingly, there has been shown and described herein a novel and useful system for converting pulses from an analog-pulse system to a digital-pulse system, and vice versa.

I claim:

1. Apparatus for converting a recorded analog type of motion-control pulse train read from a movable recording medium wherein the positive or negative phase displacement of each pulse in an indicating pulse train relative to a reference-carrier pulse train also recorded in a track on said recording medium represents positive or negative motion, to a recorded digital type of motion-control pulse train wherein a pulse recorded in a first recording track represents an increment of motion in a positive direction and a pulse recorded in a second recording track represents an increment of motion in a negative direction, said apparatus comprising a pulse generator for generating pulses at a repetition frequency $f_0 = f_c D/U$ where $f_c$ is the reference-carrier pulse-train frequency, D is the distance corresponding to a phase shift of one full cycle at the carrier frequency $f_c$, and U is the distance represented by one pulse in the digital type of motion-control pulse train, a first counter to which said pulse-generator output is applied for dividing the output frequency of said pulse generator to the frequency of said reference carrier, means for deriving said reference-carrier pulse-train from said movable recording medium, first means for comparing the phase of the output of said first counter with the phase of said reference carrier obtained from said means for deriving to obtain a signal indicative of a difference, means for controlling the speed of said movable recording medium responsive to said signal to minimize said difference signal, a second counter having the same count capacity as said first counter, means for applying output from said pulse generator to said second counter, means for deriving said indicating pulse train from said recording medium, second means for comparing the phase of said derived pulse train with output from said second counter and providing a first output signal indicative of said derived pulse train leading the phase of said second counter output, and a second output signal indicative of said derived pulse train lagging the phase of said second counter output, means responsive to a first output signal to advance said second counter counting rate until said first output signal is no longer provided, means responsive to a second output signal to retard said second counter counting rate until said second output signal is no longer present, a recording medium having first and second tracks, and means for recording a digital pulse in a first track on said recording medium responsive to a first output signal and a predetermined count of said first counter and for recording a digital pulse in a second track on said recording medium responsive to a second output signal and said predetermined count of said first counter.

2. Apparatus for converting a recorded analog type of motion-control pulse train read from a movable recording medium wherein the positive or negative phase displacement of each pulse in an indicating pulse train relative to a reference-carrier pulse train also recorded in a track on said recording medium represents positive or negative motion, to a recorded digital type of motion-control pulse train wherein a pulse recorded in a first recording track represents an increment of motion in a positive direction and a pulse recorded in a second recording track represents an increment of motion in a negative direction, said apparatus comprising a pulse generator for generating pulses at a repetition frequency $f_0 = f_c D/U$ where $f_c$ is the reference-carrier pulse-train frequency, D is the distance corresponding to a phase shift of one full cycle at the carrier frequency $f_c$, and U is the distance represented by one pulse in the digital type of motion-control pulse train, a first counter to which said pulse-generator output is applied for dividing the output frequency of said pulse generator to the frequency of said reference carrier, means for deriving said reference-carrier pulse-train from said movable recording medium, first means for comparing the phase of the output of said first counter with the phase of said reference carrier obtained from said means for deriving to obtain a signal indicative of a difference, means for controlling the speed of said movable recording medium responsive to said signal to minimize said difference signal, a second counter having the same count capacity as said first counter, means for applying output from said pulse generator to said second counter, means for deriving said indicating pulse train from said recording medium, second means for comparing the phase of said derived pulse train with output from said second counter and providing a first output signal indicative of said derived pulse train leading the phase of said second counter output, and a second output signal indicative of said derived pulse train lagging the phase of said second counter output and a third output signal indicative of a phase difference, a flip-flop circuit having a first and a second stable state, means for driving said flip-flop circuit to its first stable state responsive to a first output signal and to its second stable state responsive to a second output signal, means to which said pulse generator output is applied and responsive to said third output signal for storing a number of pulses representative of the extent of the difference in phase indicated by said third output signal, means for advancing the count in said second counter an extra count within each counting cycle of said first counter responsive to said flip-flop circuit being in its first stable state and a pulse being stored in said means for storing a number of pulses, means for retarding the count in said second counter by one count within each counting cycle of said first counter responsive to said flip-flop circuit being in its second stable state and a pulse being stored in said means for storing a number of pulses, a recording medium having first and second tracks, and means for recording a digital pulse in a first track on said recording medium responsive to said flip-flop circuit being in its first stable state and a predetermined count of said first counter and for recording a digital pulse in a second track on said recording medium responsive to said flip-flop circuit being in its second stable state and said predetermined count of said second counter.

3. Apparatus as recited in claim 2 wherein said means to which said pulse-generator output is applied and responsive to said third output signal for storing a number of pulses representative of the difference in phase indicated by said third output signal includes a two-input AND gate to which said pulse-generator output and said third output signal are applied, a reversible counter to which output from said AND gate is applied for driving said reversible counter in an additive direction, and means for driving said reversible counter in a subtractive direction responsive to operation of both said means for advancing the count in said second counter and said means for retarding the count in said second counter.

4. Apparatus for converting a recorded analog type of motion-control pulse train read from a movable recording medium wherein the positive or negative phase displacement of each pulse in an indicating pulse train relative to a reference-carrier pulse train also recorded in a track on said recording medium represents positive or negative motion, to a recorded digital type of motion-control pulse train wherein a pulse recorded in a first recording track represents an increment of motion in a positive direction and a pulse recorded in a second recording track represents an increment of motion in a negative direction, said apparatus comprising a pulse generator for generating pulses at a repetition frequency $f_0 = f_c D/U$ where $f_c$ is the reference-carrier pulse-train frequency, D is the distance corresponding to a phase shift of one full cycle at the carrier frequency $f_c$, and U is the distance represented by one pulse in the digital type of motion-control pulse train, a first counter to which said pulse-generator output is applied for dividing the output frequency of said pulse generator to the frequency of said reference carrier, means for deriving said reference-carrier pulse-train from said movable recording medium, first means for comparing the phase of the output of said first counter with the phase of said reference carrier obtained from said means for deriving to obtain a signal indicative of a difference, means for controlling the speed of said movable recording medium responsive to said signal to minimize said difference signal, a second counter having the same count capacity as said first counter, means for applying output from said pulse generator to said second counter, means for deriving said indicating pulse train from said recording medium, second means for comparing the phase of said derived pulse train with output from said second counter and providing a first output signal indicative of said derived pulse train leading the phase of said second counter output, and a second output signal indicative of said derived pulse train lagging the phase of said second counter output and a third output signal indicative of a phase difference, a flip-flop circuit having a first and a second stable state, means for driving said flip-flop circuit to its first stable state responsive to a first output signal and to its second stable state responsive to a second output signal, a two-input AND gate, means for applying output from said pulse generator and said third output signal to said two-input AND gate, a reversible counter having an initial count condition, means for applying output from said two-input AND gate to said reversible counter to be counted additively, means for deriving a nonzero output from said counter when it is in a count condition other than said initial count condition, a three-input AND gate, means for applying a predetermined count output from said reference counter to one input of said three-input AND gate, means to apply said nonzero output to a second input of said three-input AND gate, means to apply an inhibiting input to the third input of said three-input AND gate responsive to a third output signal, means to apply output from said three-input AND gate to said reversible counter to reduce the count in said reversible counter, a second flip-flop circuit having a first and second stable state, means to drive said second flip-flop circuit to its first stable state responsive to said three-input AND gate output, means to drive said second flip-flop circuit to its second stable state responsive to a predetermined count output from said reference counter preceding the one applied to said three-input AND gate, means to advance the count of said second counter responsive to both the output of said pulse generator and said second flip-flop circuit being in its second stable state, means to advance the count of said second counter two counts responsive to said first and second flip-flop circuits being in their first stable states, a recording medium having first and second tracks, means for recording a digital pulse in said first track responsive to said first and second flip-flops being in their first stable states, and means for recording a digital pulse in said second track responsive to said first flip-flop being in its second stable state and said second flip-flop being in its first stable state.

References Cited in the file of this patent
UNITED STATES PATENTS 2,833,941   Rosenberg et al. _____ May 6, 1958